UNITED STATES PATENT OFFICE.

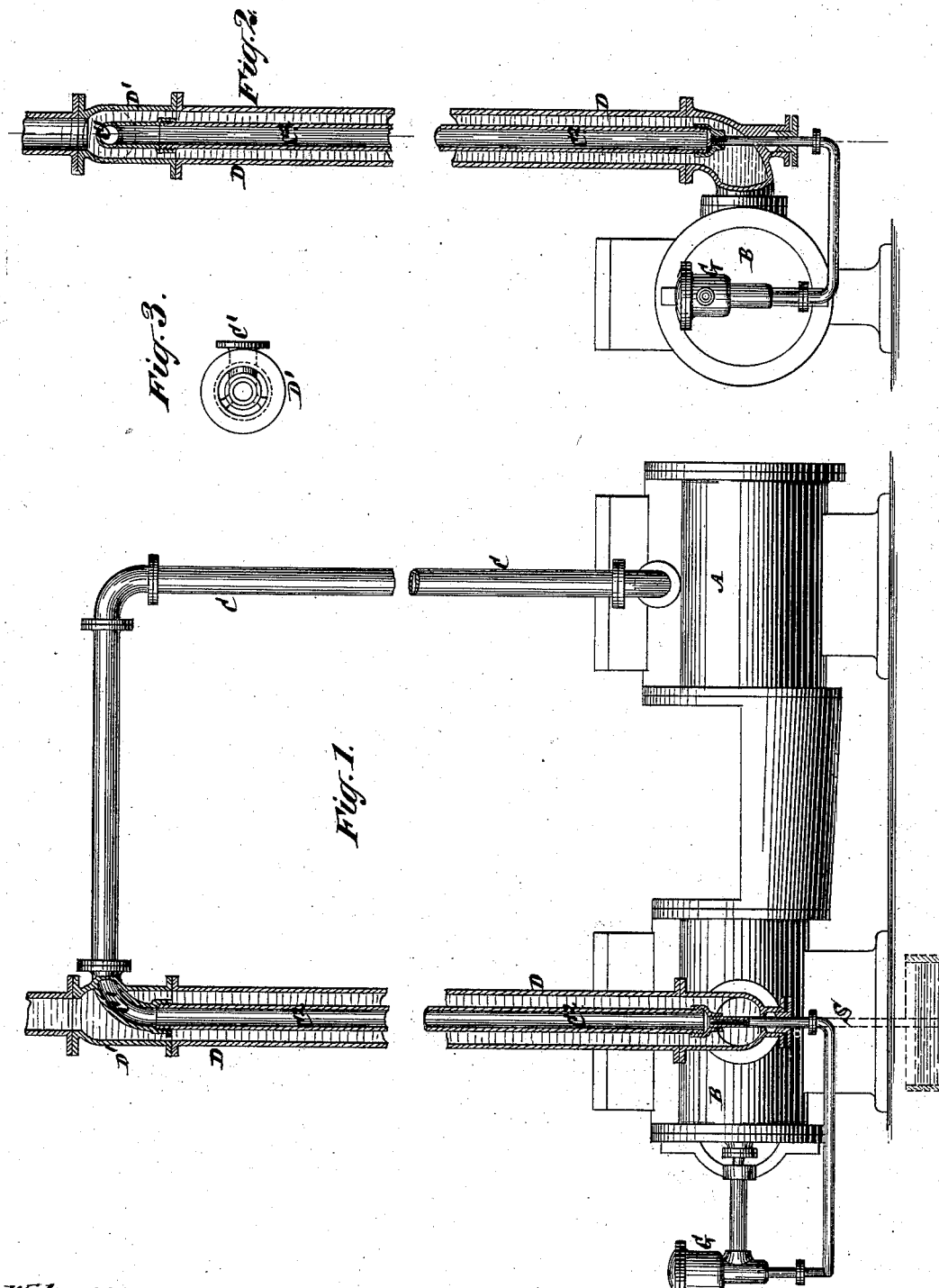

WILLIAM CRAIG, OF NEW YORK, N. Y.

IMPROVEMENT IN STEAM-PUMPS.

Specification forming part of Letters Patent No. 217,271, dated July 8, 1879; application filed November 13, 1878.

*To all whom it may concern:*

Be it known that I, WILLIAM CRAIG, of the city, county, and State of New York, have invented a new and useful Improvement in Steam-Pumps and Pumping-Engines, of which the following is a description, reference being had to the accompanying drawings, forming part of this specification.

This invention relates to means for condensing the exhaust-steam of steam-pumps and pumping-engines applicable to mines, and other purposes in which the discharge-water of the pump is allowed to run to waste or is designed to be employed for some special purpose which is distinct from merely producing a vacuum in the steam-pump or pumping-engine; and the invention consists in a combination of the exhaust-steam pipe of a steam-pump or pumping-engine and the discharge-water pipe of said pump or engine, the former pipe arranged longitudinally within and surrounded by the latter, for the purpose of producing a vacuum by surface condensation in said engine, to augment the power of the latter, free from any special supply of water or expensive expenditure of power to obtain the required vacuum. In this all-important respect the invention essentially differs from those combinations or arrangements in which a pump or some similar device is employed for the special purpose of drawing or circulating condensing-water through a surface-condenser, and in which a special application of power and special supply of water are necessary at a considerable expense, whereas my invention does not necessarily involve any special expense to obtain the necessary vacuum in the engine.

The invention is not only applicable to engines for pumping water from mines, but also to pumps for supplying buildings of various kinds with water, and to other purposes or uses, and, as hereinafter specified, possesses numerous special advantages.

In the accompanying drawings, Figure 1 represents a vertical, partly sectional, longitudinal view of a steam-pump or pumping-engine having the invention applied. Fig. 2 is a partly-sectional end view of the same; and Fig. 3, an under view of a connection applied to the water-discharge pipe of the pump at its junction with the exhaust-steam pipe thereof.

A is the steam-cylinder of the pump, (here shown to occupy a horizontal position,) and B is the water or pumping cylinder thereof. These cylinders are provided with the usual or any suitable reciprocating pistons, inlet and outlet valves, and pipes for supplying the cylinder A with steam and the cylinder B with water by suction or otherwise.

C is the exhaust-steam pipe of the cylinder A, and D the water-discharge pipe of the cylinder B. The pipe C is here represented as projecting upward to any desired height, and as connecting by a horizontal continuation of it with a nozzle, $C^1$, which is cast to a branch or connection, $D'$, on or in a water-discharge and stand pipe, D, of the pumping-cylinder B. Connected to the nozzle $C^1$ is a downward extension, $C^2$, of the exhaust-steam pipe, of which latter the nozzle $C^1$ forms a part. This exhaust-steam-pipe extension $C^2$ projects down within and is surrounded by the discharge-water stand-pipe D of the pump, and may be connected at its bottom with a small pump, G, for drawing off the water of condensation produced by condensation of the steam in the exhaust-steam pipe of the engine through surface condensation consequent on the flow of discharge-water up the stand-pipe D and around the outside of the portion of the exhaust-steam pipe which projects down within the stand-pipe.

Said pump G may be of very much less dimensions than a circulating or ordinary condenser air-pump, and when used provides for giving all the steam used by the steam-cylinder back to the boiler in the condition of pure water, which is very desirable in mines where the water is impure. If desired, however, the pump G may be altogether dispensed with, and the pipe $C^2$ or the smaller pipe S, which connects with its lower end, be extended a sufficient distance to support within it a column of water corresponding to the vacuum required, said smaller pipe entering at its lower end within a reservoir, as shown by dotted lines in Fig. 1.

By this improvement a steady vacuum at little or no working cost may be obtained for the engine, and all liability of the vacuum being impaired by the heating of the pump, as in ordinary condensers, is avoided.

The extent of surface condensation may be varied according to the vacuum required; but it is desirable to continue the exposure of the exhaust-steam pipe a sufficient distance within the water-discharge pipe of the pump to insure perfect condensation at the lower or delivery end of the exhaust-steam pipe.

Not only by this invention is there the economy of using the discharge-water of the pump for condensing the steam, as hereinbefore referred to, but, while said invention is particularly serviceable in mines, it would be very difficult, if not impossible, to apply an ordinary surface-condenser to the discharge-pipe of mining-pumps, inasmuch as the many small tubes of which said condensers are usually composed would be very liable to leak, whereas my invention admits of a simple gland and stuffing-box single-pipe connection answering every purpose, and effectually compensating for all probable or possible expansion and contraction of parts.

The invention is not restricted to any particular kind of pump or pumping-engine. Furthermore, although the exhaust-steam and discharge-water pipes of the pumping-engine are here represented as mainly occupying a vertical position, they may in some cases be arranged inclined from the vertical position or otherwise.

The exhaust-steam pipe may be straight pipe, as illustrated in the drawings, or it may be of any of the well-known forms now in use, the object being to expose an extended surface to the water in the stand or discharge-water pipe D.

I claim—

The combination, with the discharge-water pipe of a steam-pump or pumping-engine, of an exhaust-steam pipe extending into and longitudinally through the said discharge-water pipe, and surrounded thereby and forming therein a condensing-chamber, substantially as set forth, for the purpose specified.

WILLIAM CRAIG.

Witnesses:
 T. J. KEANE,
 FRED. HAYNES.